J. WAGNER.
BICYCLE.
APPLICATION FILED APR. 26, 1917.

1,264,231.

Patented Apr. 30, 1918.
3 SHEETS—SHEET 2.

Inventor
Joseph Wagner.
By his Attorney
Oscar Geier

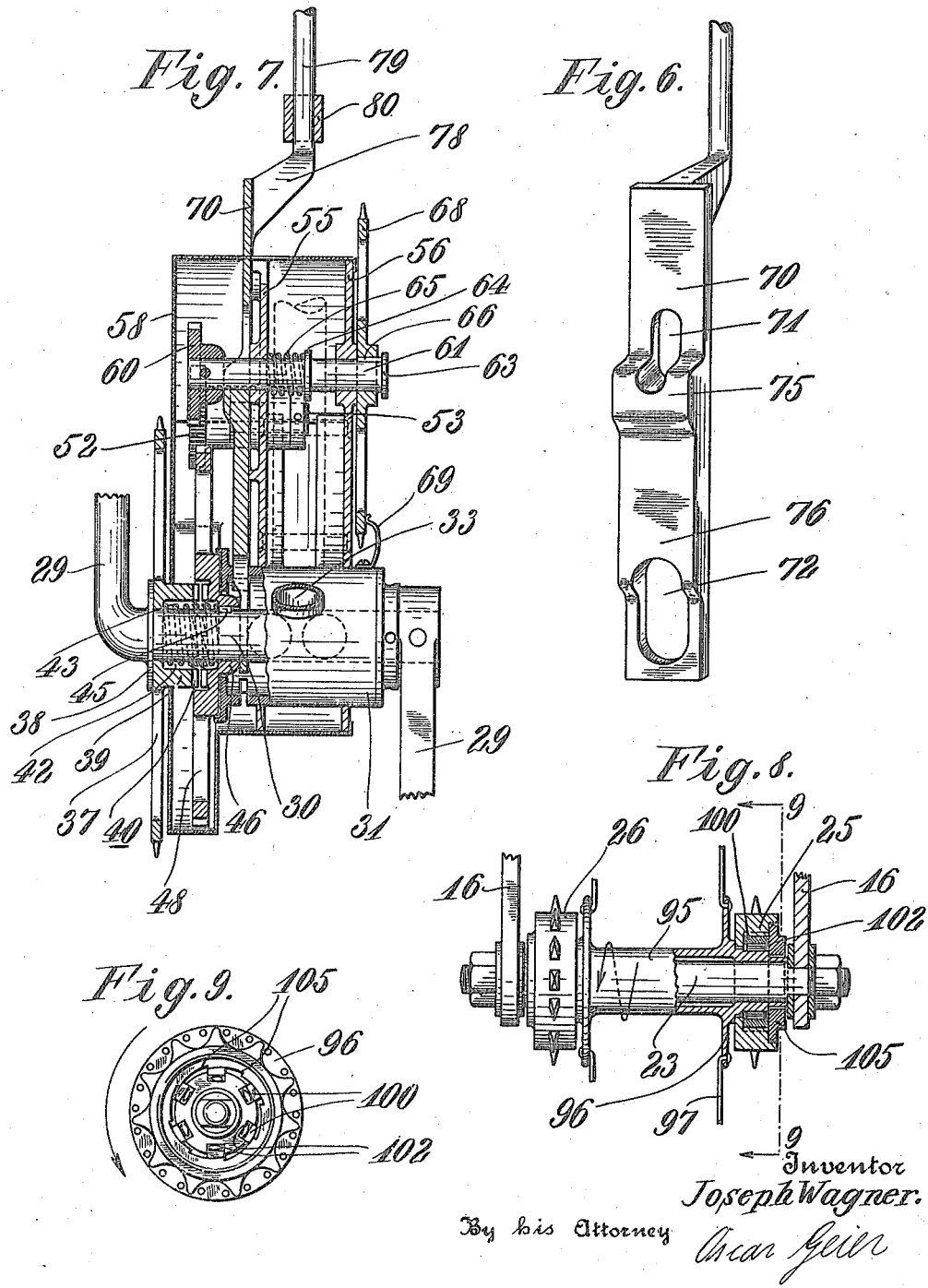

UNITED STATES PATENT OFFICE.

JOSEPH WAGNER, OF WINDSOR, WISCONSIN.

BICYCLE.

1,264,231.  Specification of Letters Patent.  Patented Apr. 30, 1918.

Application filed April 26, 1917. Serial No. 164,683.

*To all whom it may concern:*

Be it known that I, JOSEPH WAGNER, a subject of the Emperor of Austria, resident of Windsor, county of Dane, and State of Wisconsin, have invented certain new and useful Improvements in Bicycles, of which the following is a specification.

This invention relates to improvements in driving gears for pedally propelled vehicles, and has as its principal object the provision of means whereby the vehicle may be propelled at different rates of speed, while a constant number of revolutions are imparted through the pedals.

A further object is to provide means combined with said speed changing devices as will permit either high or low gear to be put in operation with entire ease and facility.

These and other like objects are attained by the novel design, construction and combination of parts hereafter described and shown in the accompanying drawings, forming a material part of this disclosure, and in which:—

Fig. 6 is a perspective view showing the gear changing slide.

Fig. 7 is a vertical sectional view similar to that of Fig. 2 but showing the high or fast gear in engagement.

Fig. 8 is a fragmental front elevational and sectional view taken substantially on line 8—8 of Fig. 1, and Fig. 9 is a transverse sectional view taken on line 9—9 of Fig. 8.

Figure 1:
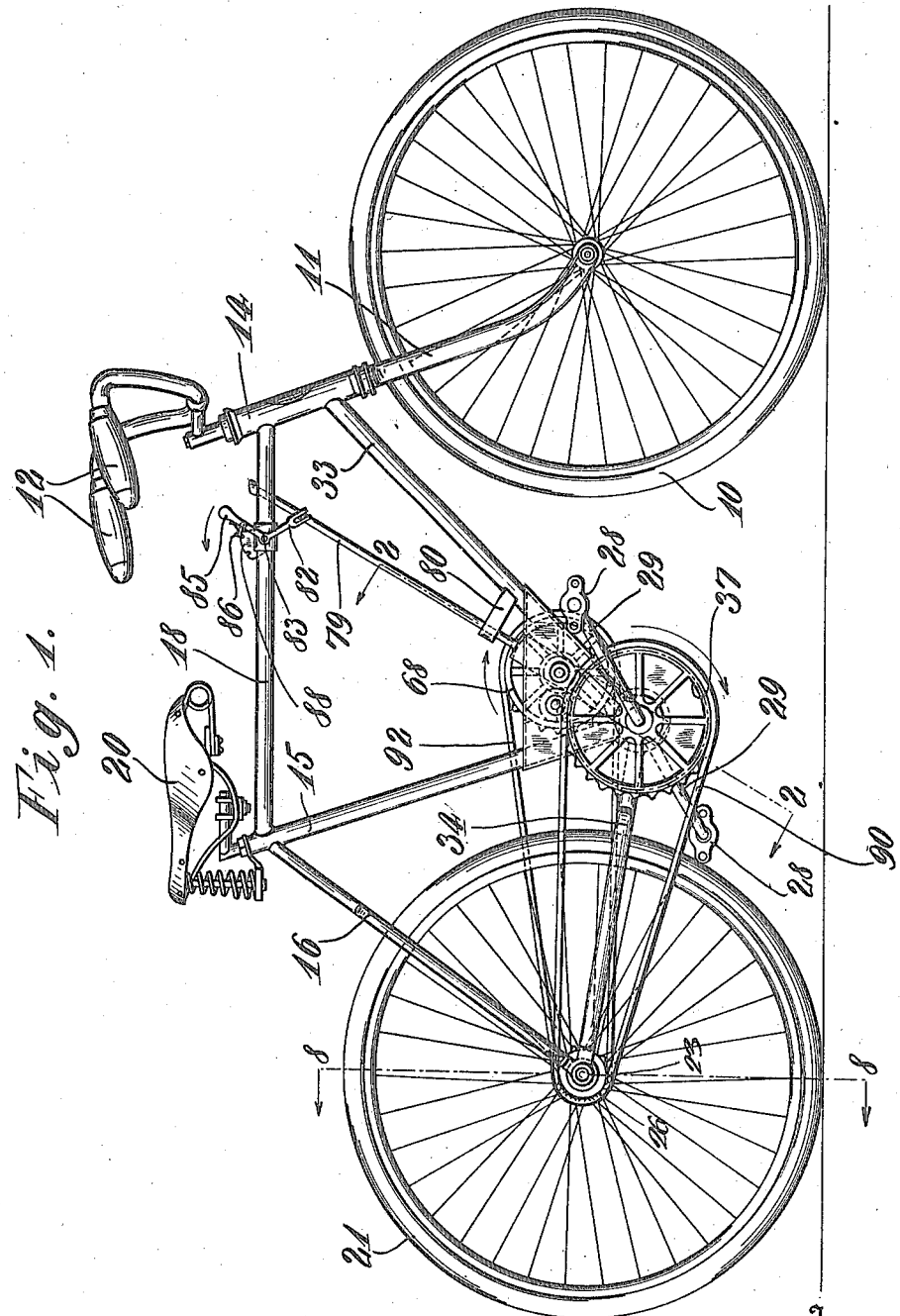
Figure 1 is a side elevational view of a conventional form of bicycle made in accordance with the invention.

In the bicycle indicated, the wheel 10 is held between forks 11 controlled by the handle bars 12.

Passing between the tubular guide 14, post 15, and forks 16 is a compression tube 18 below the seat 20 as is usual, the wheel 21 being contained between the rigid forks 16 and has mounted upon the shaft 23 a pair of sprockets, respectively 25 and 26.

The pedals 28 are connected by means of the cranks 29, with the driving shaft 30 held in bearings 31, supported by the post 15, front strap 33 and forks 34 as is usual.

A sprocket wheel 37 is rotatably mounted upon the shaft 30, which is formed with a fixed collar 38, limiting the outer movement of the hub 39 on the sprocket wheel, the outer end of which is formed with ratchet teeth 40 and contains an annular recess 42 in which is disposed the spirally wound push spring 43, maintaining the opposite end of the hub normally against the fixed collar 38.

A fixed key 45 set in the shaft 30 engages and transmits rotary motion to the hub 46 of the spur gear 48, the hub having on its inner side a plurality of ratchet teeth 50 adapted to engage with the corresponding ratchet teeth 40 in the sprocket wheel.

This spur gear transmits rotary motion to the pinion 52 mounted upon the stud 53 carried by a rigid frame 55, a similar frame element 56 being upon the opposite side of the casing 58 attached as a housing for the gear train, the final member of which consists of a spur pinion 60, pinned or otherwise secured to the shaft 61 so mounted in the frames 55 and 56 as to slide longitudinally therein, this sliding motion being limited by the fixed head 63 formed in the outer end of the shaft 61, which also has secured to it a collar 64 against which one end of the push springs 65 abuts, the other end of the spring pressing against the frame 55.

A key 66 passes in the outer end of the shaft 61, which rotates the sprocket wheel 68 and at the same time permits it to slide on the shaft, there being held in operative position by means of the spring 69 secured to the bearing 31 of the shaft 30, in such manner that its free end presses against the edge of the gear, tending to hold it in close relation to the frame element 56.

A shifting cam plate 70 is provided with longitudinal slots, respectively 71 and 72, the first of which is adapted to surround the shaft 61 and the latter the shaft 30, so that the cam plate can be moved longitudinally and with relation to the mentioned shafts.

Formed on the cam plate 70 are two elevations, respectively 75 and 76, the latter of which is suited to make contact with the end of the hub 46 of the spur gear 48, so as to move the same longitudinally upon the shaft 30, thereby putting the clutches into or out of engagement.

In the same manner, the raised projection 75 makes contact with the hub of the gear 60 and through its connection with the shaft 61 causes the latter to move longitudinally.

The plate 70 is actuated through the connection 78 to which is attached the rod 79 operating through the bearing 80 and actuated by the forks 82 pivoted by the pin 83 to the compression bar 18, the forks terminating in an angularly turned handle 85 which carries the spring actuated dog 86 adapted to engage with either of the openings in the plate 88 also attached to the compression member, the handle 85 being convenient for access by a rider seated on the seat 20.

Figure 2:
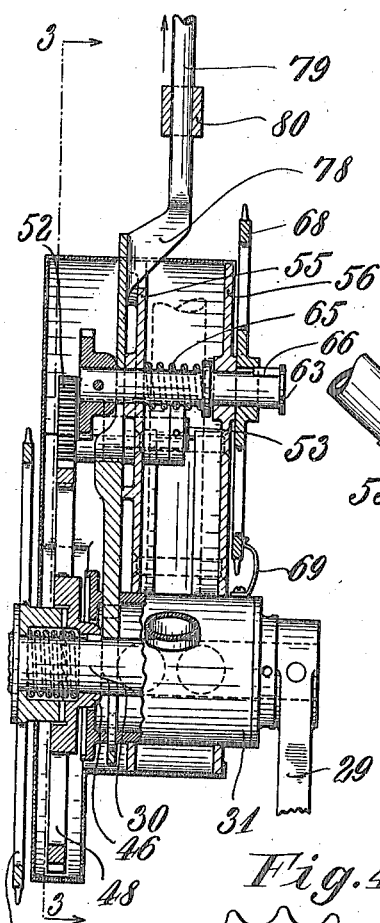
Fig. 2 is an enlarged vertical sectional view taken on line 2—2 of Fig. 1, showing the lower gear in operative engagement.
Figure 3:
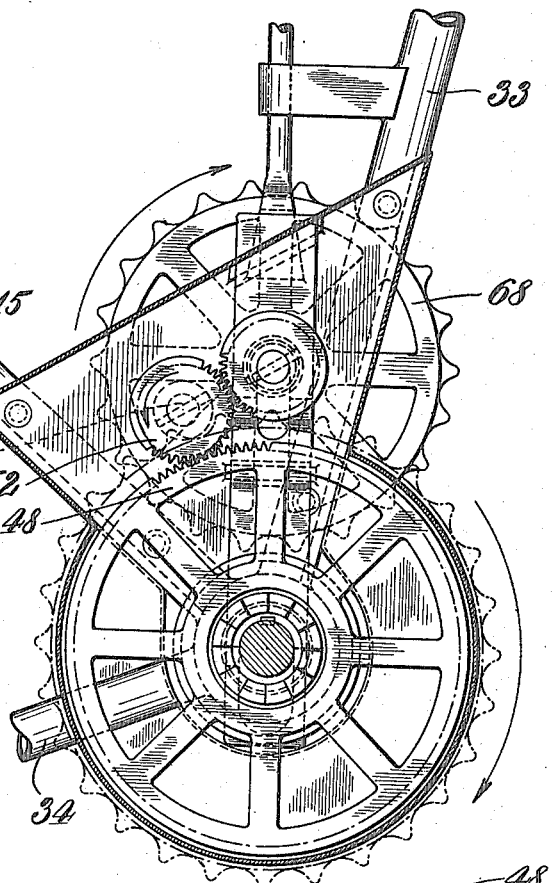
Fig. 3 is a side elevational and sectional view of the same.
Figure 4:
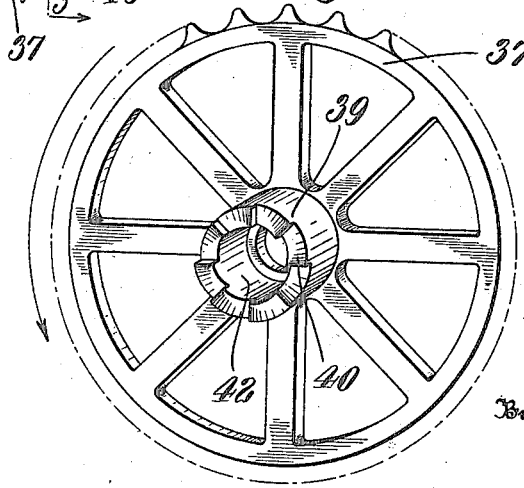
Fig. 4 is a perspective view showing the driving sprocket and clutch.
Figure 5:
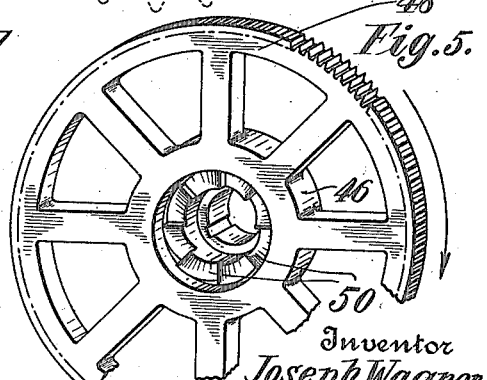
Fig. 5 is a similar perspectve view showing the clutch engaging gear.

Obviously, rotary motion may be communicated from the sprocket 37, to the sprocket 26, when it is desired, by means of the chain 90, at which time the handle lever 85 will be in a forward position by depressing the cam plate 70 causing the clutches 40 and 50 to engage as is best shown in Fig. 2.

When the lever handle 85 is in its rearward position, the rod 39 and cam-plate 70 are raised, releasing the clutches and moving the gears so as to engage, transmitting motion to the sprocket wheel 68 and through the chain 92 to the driving sprocket 25.

By use of the intermediate gear 52, it will be observed that the direction of movement of the driving chain from either of the sprockets 37 or 68 is the same.

As it is not desired to remove the chain when changing gears and both are operated at the same time, and in order to prevent the inoperative sprocket from rotating, both of the sprocket pinions 25 and 26 are held to the sleeve 95, upon which are formed the disks 96 carrying the spokes 97, by means of ratchet pawls 100, the same being contained in grooves formed in the hub ends of the sleeve 95 and pressed outwardly by flat springs 102 so as to engage with the internal ratchet 105 formed in the interior of the respective ratchet pinion, thus permitting the idle pinion to rotate freely upon the sleeve and without transmitting motion to the inoperative sprocket wheel.

From the foregoing, it will be seen that a practical device is presented, whereby a different speed of the bicycle may be attained without changing the speed of rotation of the pedals by merely shifting the handle lever 85 in either of its positions.

Having thus described my invention, what I claim as new, and desire to secure by Letters Patent, is:—

In a two-speed transmitting device, the combination with a driving shaft, a sprocket rotatably mounted thereon, a spur gear slidable on said shaft and driven thereby, clutches on the engaging surfaces of said driving sprockets and said spur gear, a second shaft rotatably mounted contiguous to said driving shaft, a driving sprocket slidably mounted on said second shaft, a pinion secured to said shaft, an intermediate gear transmitting rotary motion between said pinion and said spur gear, a sliding cam plate, means for manually operating said cam plate, and means combined with said cam plate for causing said clutches to engage or for shifting said second shaft, whereby either of said driving sprockets may be actuated.

In testimony whereof I have affixed my signature.

JOSEPH WAGNER.

Copies of this patent may be obtained for five cents each, by addressing the "Commissioner of Patents, Washington, D. C."